(No Model.)
J. T. HOUGH.
HAY RAKE AND SHOCKER.
No. 524,439. Patented Aug. 14, 1894.
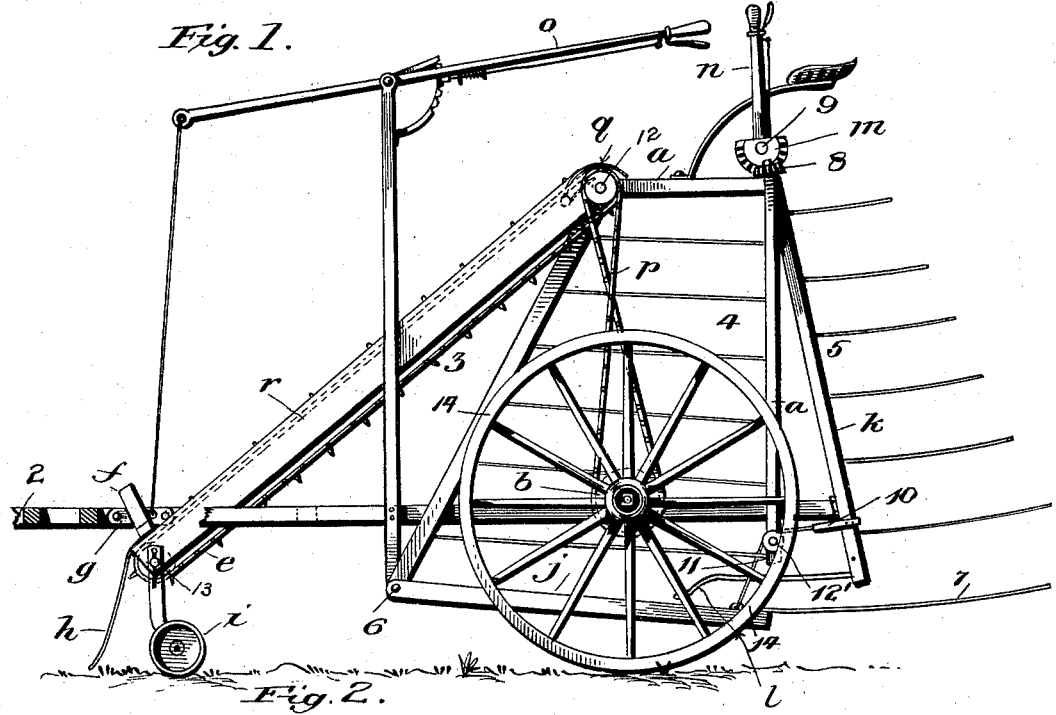
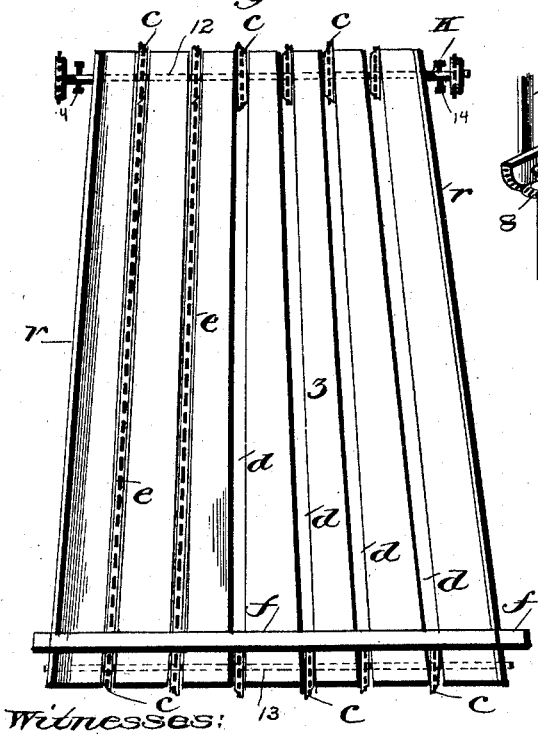
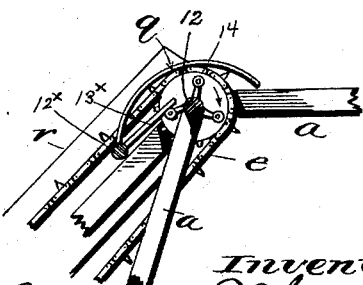
Witnesses:
L. C. Hills
A. L. Hough
Inventor:
Johnston T. Hough,
by Franklin H. Hough
Atty.

UNITED STATES PATENT OFFICE.

JOHNSTON T. HOUGH, OF RUEDI, COLORADO.

HAY RAKE AND SHOCKER.

SPECIFICATION forming part of Letters Patent No. 524,439, dated August 14, 1894.

Application filed April 24, 1894. Serial No. 508,834. (No model.)

*To all whom it may concern:*

Be it known that I, JOHNSTON T. HOUGH, a citizen of the United States, residing at Ruedi, in the county of Eagle and State of Colorado, have invented certain new and useful Improvements in Hay Rakes and Shockers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to combined hay rakes and shockers; and it aims to provide in a single organized machine a rake for gathering the hay which will automatically adjust itself to the ground without digging therein and which is under the control of the driver to be elevated at will, an elevator that will simultaneously with the lifting of the hay, gather the same into a compact form, a shock-forming receptacle having a vertically movable bottom or platform and having rear gates which are operatively connected with the bottom of the said receptacle whereby an opening and closing of the gates causes the rising and falling of the platform, ejector arms attached to the gates for moving the shock from off the platform, and mechanism under the control of the driver for opening and closing the said gates.

The improvement consists in the novel features which will be hereinafter more fully described, and shown in the annexed drawings, in which—

Figure 1, is a side elevation of a machine embodying my improvements. Fig. 2, is a front elevation of the elevator table and carrier belts or chains. Fig. 3, is a detailed view of the shaft for operating the gates of the shock forming receptacle. Fig. 4, is a vertical section through the shaft 12 and the tines $q$.

Like letters and figures refer to the same parts throughout the several views.

Reference now being had to the details of the drawings by letters and figures, $a$ represents a frame of suitable formation to support the operating parts of the machine. A pole or tongue 2 projects forwardly from the frame, to which pole the team is attached for drawing the machine over the field. The shock-binding receptacle is closed on the two sides by frames 4 composed of end bars and cross-rods, at the rear by gates 5, and the bottom by a platform $j$ which is pivoted at the forward end at 6 and has tines 7 extended from the rear in a horizontal plane. The receptacle is broader at the base than at the top and gradually tapers or contracts from the base upward, the sides 4 and gates 5 correspondingly tapering to conform to the degree of convergence of the walls or confines of the said receptacle. The turn posts $k$ of the gates are journaled near their ends in the frame $a$ and have bevel pinions 8 at their upper ends to mesh with correspondingly toothed segments $m$ on a transverse shaft 9 to which is attached a lever $n$. By operating the lever $n$ the shaft 9 is turned and through the gearing 8 and $m$ the gates 5 are opened and closed. Short arms 10 extend at right angles from the turn posts and have connection with the rear end of the platform $j$ by chains 11 which pass over guide pulleys 12' on the frame. As the gates 5 open the platform lowers and when the gates close the platform rises. Ejector arms $l$ crooked at their free ends are attached to the turn posts and are designed to sweep across the platform $j$ and push the shock therefrom. There may be as many of these ejector-arms attached to a turn-post as may be required.

The elevator table 3 inclines from the perpendicular and is broad at the base and gradually narrows as the top is approached. Transverse shafts $12^{\times}$ and 13 are journaled at the opposite ends of the table and at proper intervals have sprocket wheels $c$ mounted thereon over which pass elevator chains or belts $e$. These chains or belts have projecting spurs at proper intervals to engage with the hay and carry the same over the table 3. The chains or belts are arranged in a converging series, *i. e.*, the space between the opposing edges of each two gradually narrows from the base to the top of the table, to cause the hay to be gradually compacted in its progress over the table.

Grooves $d$, $d$ are provided in the table 3, for the chains $e$ to travel in, whereby the latter are guided in their movements and prevented from sidewise play and twisting.

The ground wheels 14 have gear-wheels $b$ on one side around which pass bands $p$ to transmit motion to the shaft 12. Curved rods or bars $q$ protect the upper sprocket wheels $c$ and lift the hay from the chains and prevent it from winding around the shaft 12. The table 3 has sides $r$ to prevent the hay from dropping off the edge thereof.

The rake-head $f$ extends transversely of the machine and has its ends mounted in grooved castings $g$ attached to the frame $a$ and is adapted to move freely in said castings within certain limits to adapt itself to the roll or contour of the ground. Caster wheels $i$ or equivalent runners or shoes are attached to the rake head to adapt its position to the surface of the ground. The teeth $h$ are spring and are attached to the rake head in any convenient manner. A lever $o$ extending within convenient reach of the driver's seat has connection with the rake-head to adjust the same to the required elevation. The sprocket-wheels $c$ are beveled on one side to prevent binding therewith of the carrier-chains.

The bar $12^\times$ to which the rods $q$ are attached is journaled in suitable bearings and is provided at one end with an arm $13^\times$, which is engaged by tappets 14 on the shaft K to rock the said bar $12^\times$ in its bearings and vibrate the rods $q$ to lift and disengage the hay from the wheels $c$.

Having thus described my invention, what I claim to be new, and desire to secure by Letters Patent, is—

In a hay loader, the combination of a shaft around which the elevator belts pass, a bar having rods extending over the said shaft, and an arm extending from the said bar, and tappets attached to and operated by the said shaft to rock the bar and oscillate the rods attached thereto, substantially as described.

In testimony whereof I affix my signature in presence of two witnesses.

JOHNSTON T. HOUGH.

Witnesses:
LEE FORD,
JOHN C. FERRIS.